United States Patent
Yoon et al.

(10) Patent No.: US 11,353,745 B2
(45) Date of Patent: Jun. 7, 2022

(54) DISPLAY APPARATUS AND TILED DISPLAY APPARATUS INCLUDING THE SAME

(71) Applicant: Samsung Display Co., Ltd., Yongin-Si (KR)

(72) Inventors: Byung-Seo Yoon, Hwaseong-si (KR); SungWon Kim, Asan-si (KR); Byung Jin Park, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/992,471

(22) Filed: Aug. 13, 2020

(65) Prior Publication Data
US 2021/0181582 A1    Jun. 17, 2021

(30) Foreign Application Priority Data
Dec. 17, 2019 (KR) .................. 10-2019-0168986

(51) Int. Cl.
*G02F 1/13357*    (2006.01)
*G02F 1/1333*    (2006.01)

(52) U.S. Cl.
CPC .... *G02F 1/133608* (2013.01); *G02F 1/13336* (2013.01); *G02F 1/133605* (2013.01); *G02F 1/133606* (2013.01)

(58) Field of Classification Search
CPC ........... G02F 1/13336; G02F 1/133605; G02F 1/133606; G02F 1/133608
See application file for complete search history.

(56) References Cited

U.S. PATENT DOCUMENTS

| | | | |
|---|---|---|---|
| 8,964,131 B2 * | 2/2015 | Maeda | G02F 1/133308 348/794 |
| 9,423,653 B2 | 8/2016 | Lee et al. | |
| 10,073,296 B2 | 9/2018 | Kim | |
| 10,324,320 B2 | 6/2019 | Han et al. | |
| 2007/0153515 A1 * | 7/2007 | Hong | G02F 1/133603 362/237 |
| 2017/0315408 A1 * | 11/2017 | Lee | G02F 1/133611 |
| 2017/0322443 A1 * | 11/2017 | Han | G02F 1/133504 |
| 2019/0204684 A1 | 7/2019 | Yoon et al. | |

FOREIGN PATENT DOCUMENTS

| | | |
|---|---|---|
| KR | 1020060006864 A | 1/2006 |
| KR | 100571029 B1 | 10/2006 |
| KR | 1020110033472 A | 3/2011 |
| KR | 1020150009058 A | 1/2015 |
| KR | 1020160006292 A | 1/2016 |
| KR | 1020170126562 A | 11/2017 |
| KR | 1020190083017 A | 7/2019 |

\* cited by examiner

*Primary Examiner* — Julie A Bannan
(74) *Attorney, Agent, or Firm* — Cantor Colburn LLP

(57) ABSTRACT

A display apparatus includes a display module including a display area, on which an image is display, and a non-display area adjacent to the display area, a transparent mold which supports a bottom surface of the display module and overlaps the non-display area and a portion of the display area, which is adjacent to the non-display area, and a reflective mold disposed below the transparent mold to support the transparent mold and having a light reflectance greater than a light reflectance of the transparent mold.

18 Claims, 9 Drawing Sheets

DISPLAY APPARATUS AND TILED DISPLAY APPARATUS INCLUDING THE SAME

This application claims priority to Korean Patent Application No. 10-2019-0168986, filed on Dec. 17, 2019, and all the benefits accruing therefrom under 35 U.S.C. § 119, the content of which in its entirety is herein incorporated by reference.

BACKGROUND

1. Field

The disclosure herein relates a display apparatus and a tiled display apparatus including the display apparatus, and more particularly, to a display apparatus with reduced thickness of a bezel and a tiled display apparatus including the display apparatus.

2. Description of the Related Art

Display apparatuses may be classified into self-luminous display apparatuses which emit light by itself and light receiving display apparatuses including a light source that is separated from the light emitting display apparatuses. The light receiving display apparatuses may include display apparatuses, eletrophoretic display apparatuses, and electrowetting display apparatuses, for example.

Such a light receiving display apparatus may include a display panel that controls transmittance of incident light and a backlight unit that provides light to the display panel.

Recently, a width of a non-display area (or bezel) has been reduced according to demands of the markets. Constituents of the display apparatus may be coupled to each other on an area corresponding to the bezel. As the width of the bezel is reduced, the area on which the constituents of the display apparatus are coupled to each other may be reduced.

SUMMARY

The disclosure provides a display apparatus in which a dark portion of an edge is prevented from occurring to reduce a thickness of a bezel, which is visually recognized by a user or a viewer, and a tiled display apparatus including the display apparatus.

An embodiment of the invention provides a display apparatus including: a display module including a display area, on which an image is display, and a non-display area adjacent to the display area; a transparent mold which supports a bottom surface of the display module and overlaps the non-display area and a portion of the display area, which is adjacent to the non-display area; and a reflective mold disposed below the transparent mold to support the transparent mold and having a light reflectance greater than a light reflectance of the transparent mold.

In an embodiment, the display module may include a display panel and an optical sheet disposed below the display panel, and the transparent mold may support a bottom surface of the optical sheet.

In an embodiment, the display apparatus may further include a diffusion plate disposed below the display module, wherein the transparent mold may include: a first support part which supports the bottom surface of the display module; and a second support part extending from an end of the first support part in parallel to the display module, where an end portion of the diffusion plate may be disposed on the second support part.

In an embodiment, the diffusion plate and the first support part may be spaced apart from each other.

In an embodiment, the display area may be divided into an edge display area adjacent to the non-display area and a center display area which is not adjacent to the non-display area, and the second support part may overlap a portion of the center display area, which is adjacent to the edge display area.

In an embodiment, the reflective mold may include an inclined surface on an upper portion thereof, the transparent mold may include a support part which supports the display module and an inclined part inclined downward from an end of the support part, where the inclined part may be disposed on the inclined surface of the reflective mold.

In an embodiment, the display apparatus may further include a hook between the transparent mold and the reflective mold, wherein the hook may couple the transparent mold to the reflective mold.

In an embodiment, the transparent mold may further include a coupling part extending downward from an end of the inclined part.

In an embodiment, the display apparatus may further include an adhesive member between the inclined part and the inclined surface of the reflective mold, where the reflective mold may further include a fixing groove, and the coupling part may be coupled to the fixing groove.

In an embodiment, the display apparatus may further include a bottom cover coupled to the coupling part.

In an embodiment, the first support part may include an inner surface facing the diffusion plate and an outer surface opposite to the inner surface, and the display apparatus may further include a reflective tape overlapping the outer surface of the first support part.

In an embodiment, the display module may include a display panel and an optical member disposed below the display panel, and the optical member may include: first and second light diffusion layers; and a base substrate disposed between the first and second light diffusion layers and having a thermal expansion coefficient less than a thermal expansion coefficient of each of the first and second light diffusion layers.

In an embodiment, the transparent mold may support a bottom surface of the optical member.

In an embodiment, the transparent mold may include a light diffusion material disposed therein.

In an embodiment of the invention, a display apparatus includes: a display module including a display panel including a display area for displaying an image and a non-display area adjacent to the display area, a diffusion plate disposed below the display panel and an optical sheet disposed between the display panel and the diffusion plate; a reflective mold disposed below the display module; and a transparent mold disposed between the display module and the reflective mold to support the display module, where the transparent mold includes: a first support part which supports a bottom surface of one end of the optical sheet and overlapping the non-display area and a portion of the display area, which is adjacent to the non-display area; a second support part which supports a bottom surface of an end portion of the diffusion plate; and an inclined part extending to be inclined from an end of the first support part and having a bottom surface contacting a top surface of the reflective mold.

In an embodiment, the diffusion plate and the first support part may be spaced apart from each other.

In an embodiment, a spaced distance between the diffusion plate and the first support part may be in a range of about 1.5 millimeters (mm) to about 2.5 mm.

In an embodiment, a vertical distance between the diffusion plate and the reflective mold may gradually increase as being away from the non-display area toward the inside of the display area.

In an embodiment, the display apparatus may further include a coupling part extending from an end of the inclined part and coupled to the reflective mold or a bottom cover.

In an embodiment, a cross-sectional width area between the second support part and the diffusion plate may be about 2 mm or greater.

In an embodiment of the invention, a tiled display apparatus includes: a plurality of display apparatuses arranged in an M×N matrix form, where M and N are natural numbers, and each of the plurality of display apparatuses includes: a display module including a display area, on which an image is display, and a non-display area adjacent to the display area; a transparent mold which supports a bottom surface of the display module and overlaps the non-display area and a portion of the display area, which is adjacent to the non-display area; and a reflective mold disposed below the transparent mold to support the transparent mold and having a light reflectance greater than a light reflectance of the transparent mold.

In an embodiment, each of the plurality of display apparatuses may further include a diffusion plate disposed below the display module, wherein the transparent mold may include: a first support part which supports the bottom surface of the display module; and a second support part extending from an end of the first support part in parallel to the display module, where an end portion of the diffusion plate may be disposed on the second support part.

In an embodiment, the diffusion plate and the first support part may be spaced apart from each other.

In an embodiment, the display area may be divided into an edge display area adjacent to the non-display area and a center display area which is not adjacent to the non-display area, and the second support part may overlap a portion of the center display area, which is adjacent to the edge display area.

BRIEF DESCRIPTION OF THE FIGURES

The above and other features of this disclosure will become more apparent by describing in further detail exemplary embodiments thereof with reference to the accompanying drawings, in which.

DETAILED DESCRIPTION

Figure 1:
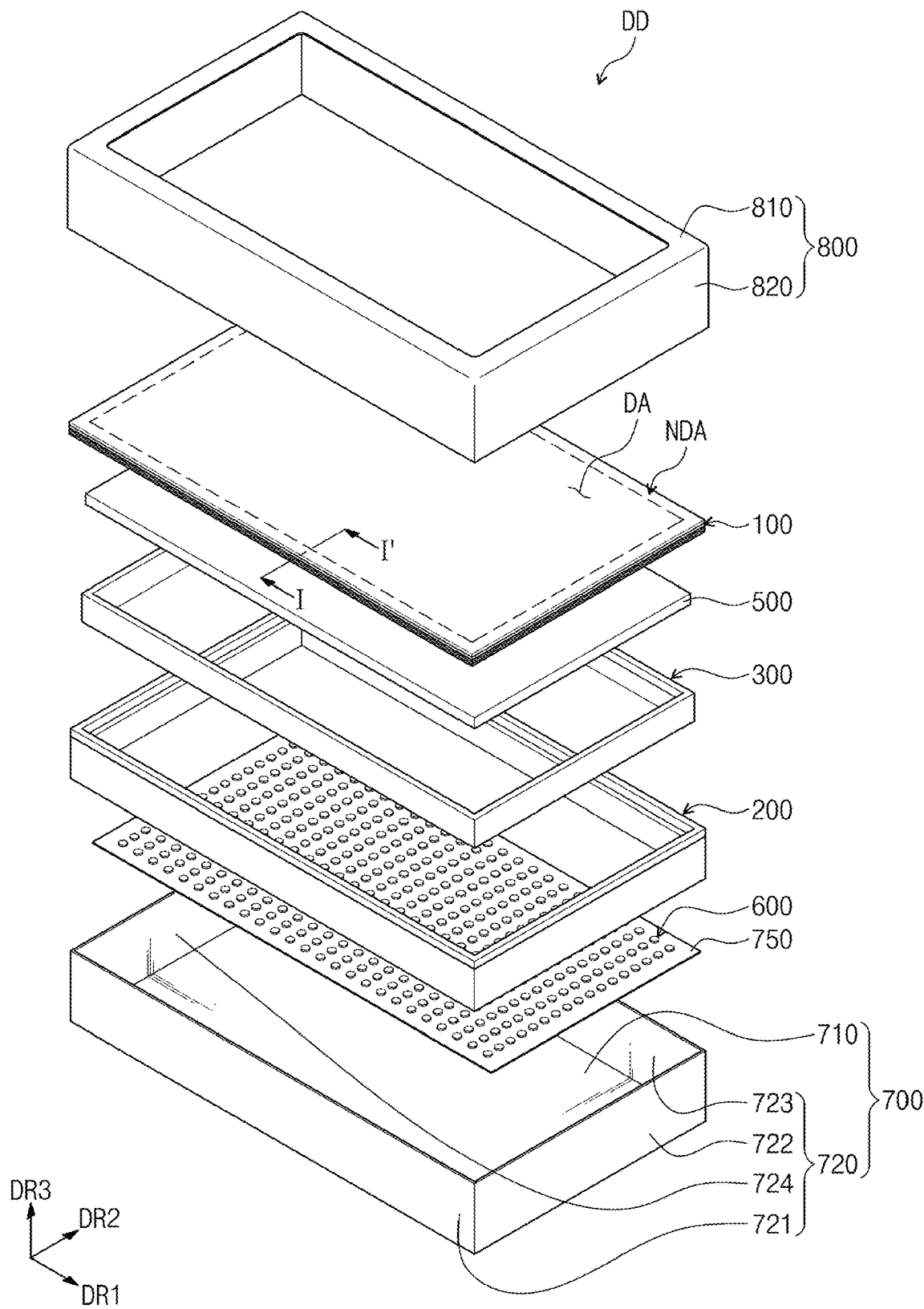
FIG. 1 is an exploded perspective view of a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In this specification, it will also be understood that when one component (or region, layer, portion) is referred to as being "on", "connected to", or "coupled to" another component, it can be directly disposed/connected/coupled on/to the one component, or an intervening third component may also be present. In contrast, when an element is referred to as being "directly on", "connected directly to", or "coupled directly to" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is an exploded perspective view of a display apparatus according to an embodiment of the invention.

Referring to FIG. 1, an embodiment of a display apparatus DD includes a display module 100, a reflective mold 200, a transparent mold 300, a diffusion plate 500, a light source 600, a bottom cover 700, a reflective sheet 750, and a top cover 800.

The display module 100 includes a display area DA and a non-display area NDA adjacent to the display area DA. The non-display area NDA may be an area extending from the display area DA in a predetermined direction. The non-display area NDA may surround the display area DA on a plane. The non-display area NDA may define a bezel. The display area DA is an area on which an image or a picture is displayed. The display module 100 may receive light incident from the light source 600 to display the image or picture on the display area DA to a user.

A transparent mold 300 that supports the display module 100 and a reflective mold 200 that supports the transparent mold 300 may be disposed below the display module 100. The diffusion plate 500 may be disposed between the display module 100 and the transparent mold 300. The reflective mold 200 is disposed on the bottom cover 700 to support a bottom surface of the transparent mold 300 and prevents light emitted from the light source 600 from leaking in a direction other than a direction toward the display module 100. The reflective mold 200 may have a relatively high reflectance.

The transparent mold 300 is disposed between the display module 100 and the reflective mold 200. The transparent mold 300 may include or be made of a transparent material to transmit the light emitted from the light source 600 to the display module 100. The transparent mold 300 is disposed between the display module 100 and the reflective mold 200 to allow light to effectively or sufficiently reach the non-display area NDA and an edge display area EDA (see FIG. 2A) adjacent to the non-display area NDA.

The diffusion plate 500 may be disposed between the display module 100 and the transparent mold 300. In one embodiment, for example, the diffusion plate 500 may be provided in the display module 100. Alternatively, the display apparatus DD may not include the diffusion plate 500.

The bottom cover 700 may include a bottom part 710 and a sidewall 720. The bottom part 710 may be flat. The bottom part 710 may be provided in a rectangular shape on a plane. The sidewall 720 may extend upward (or in a third direction DR3) from an edge of the bottom part 710. The third direction may be a thickness direction of the display apparatus DD. The sidewall 720 may include first to fourth sidewalls 721 to 724. The first to fourth sidewalls 721 to 724 may be connected to four sides of the bottom part 710, respectively. The first to fourth sidewalls 721 to 724 may extend from the bottom part 710 in the third direction DR3. The reflective sheet 750 is disposed on the bottom part 710 and disposed under the light source 600. The reflective sheet 750 may include a material that reflects light, or a material with high reflectance. The reflective sheet 750 reflects most of the light incident into the reflective sheet 750.

The display apparatus DD may further include a driving substrate (not shown). The driving substrate may be disposed between the bottom part 710 and the reflective sheet 750. The driving substrate may be electrically connected to the light source 600 to provide a driving signal to the light source 600. The driving substrate may be provided in plural.

The light source 600 is accommodated inside the bottom cover 700. The light source 600 may be provided in plural and disposed on the reflective sheet 750. The light source 600 may be provided in a direct type. The light emitted from the light source 600 may be incident directly into the diffusion plate 500 and provided to the display module 100.

The light source 600 may include at least one selected from a cold cathode fluorescent lamp ("CCFL"), a flat fluorescent lamp ("FFL"), and a light emitting diode ("LED"). Hereinafter, for convenience of description, embodiments in which the light source 600 includes the light emitting diode will be described in detail, but not being limited thereto.

In an embodiment, the light source 600 may include or be constituted by white light sources that emit white light. However, the embodiment of the invention is not limited thereto. In one alternative embodiment, for example, the light source 600 may include a red light source that emits red light, a green light source that emits green light, and a blue light source that emits blue light.

In an embodiment, the display apparatus DD may further include a top cover 800. The top cover 800 covers an edge of the display module 100 and is coupled to the display module 100, the transparent mold 300, the reflective mold 400 and the light source 600. An opening is defined through the top cover 800, and the display area DA of the display module 100 is exposed through the opening.

The top cover 800 may include a horizontal cover part 810 and a vertical cover part 820. The horizontal cover part 810 may be disposed on the non-display area NDA of the display module 100 and may not overlap the display area DA in the third direction DR3. In an embodiment, the horizontal cover part 810 may be spaced about 0.1 millimeter (mm) from the display area DA in a direction parallel to a first direction DR1. Herein, the first direction DR1 may be a length direction or a width direction of the display apparatus DD. The vertical cover part 820 may extend downward from the horizontal cover part 810 to surround outer surfaces of the reflective mold 200 and the bottom cover 700. The top cover 800 and the bottom cover 700 may be coupled to each other to accommodate the display module 100, the transparent mold 300, the reflective mold 200, and the diffusion plate 500.

Figure 2A:
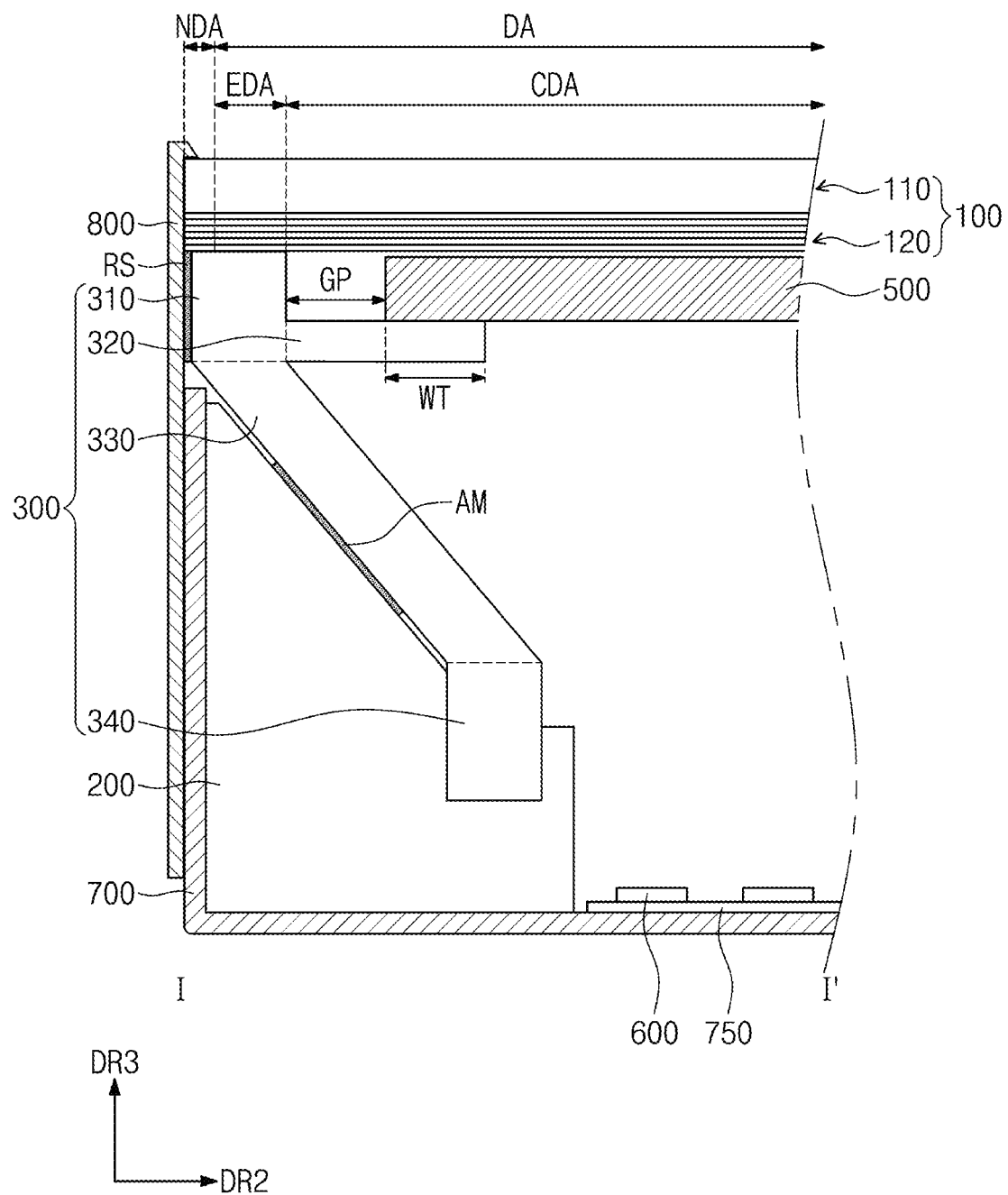
FIGS. 2A and 2B are cross-sectional views of the display apparatus according to embodiments of the invention.
Figure 2B:
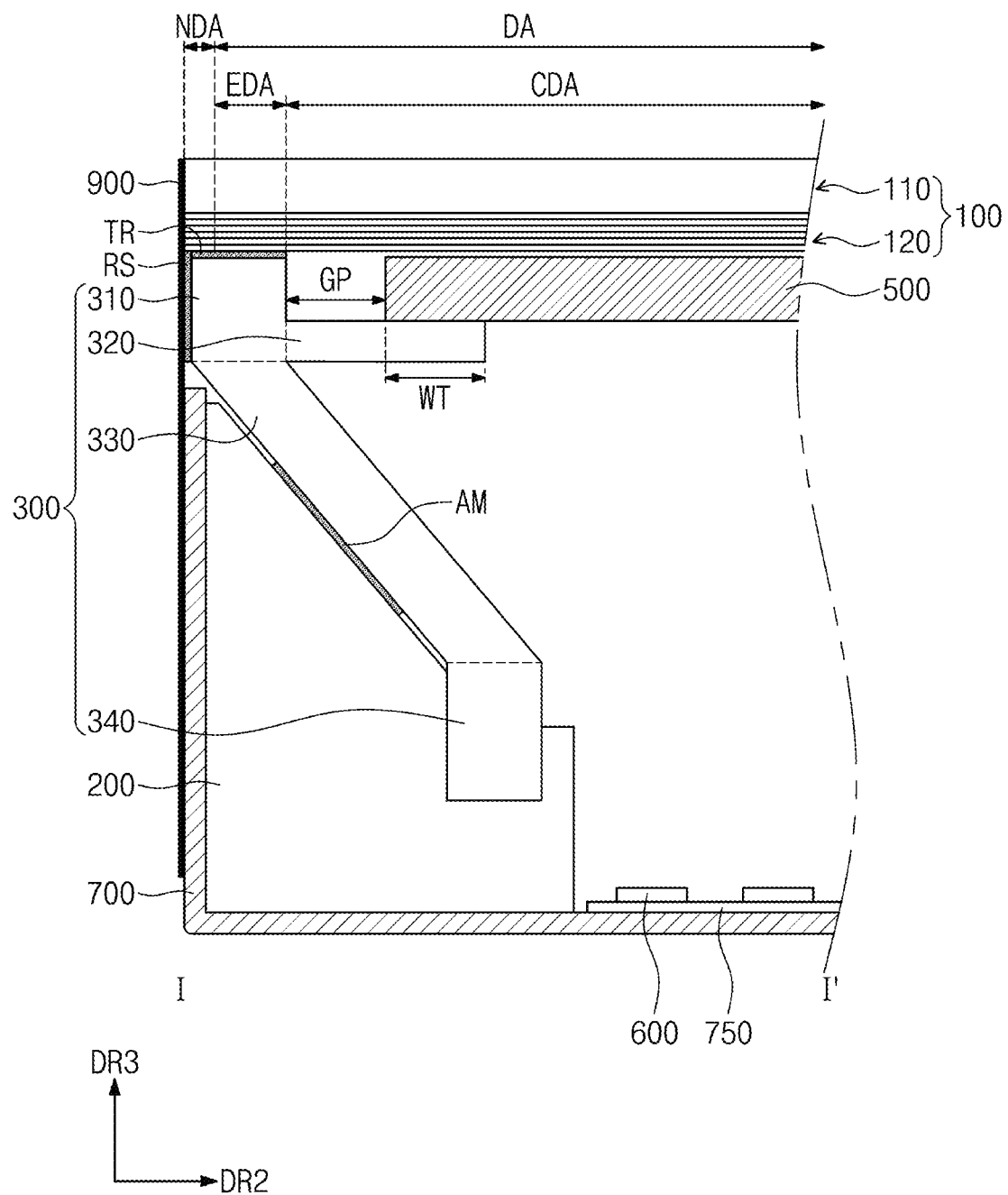

FIGS. 2A and 2B are cross-sectional views of the display apparatus according to embodiments of the invention. Each of FIGS. 2A and 2B corresponds to a cross-sectional views taken along line I-I' of FIG. 1 according to an embodiment of the invention.

Referring to FIGS. 2A and 2B, an embodiment of the display module 100 may include a display panel 110 and optical sheet 120. The display module 100 receives light from the light source 600 to display an image. The display panel 110 may be a light receiving display panel such as a liquid crystal display panel. Hereinafter, for convenience of description, embodiments where the display panel 110 is the liquid crystal display panel will be described in detail, but not being limited thereto.

The display panel 110 may include a lower substrate (not shown), an upper substrate facing the lower substrate (not shown), and a liquid crystal layer (not shown) disposed between the two substrates.

The lower substrate may include a gate line, a data line, a thin film transistor, and a pixel electrode. The gate line and the data line may be insulated from each other and may extend to cross each other. The thin film transistor may be a three-terminal device. Thus, the thin film transistor may be connected to the gate line, the data line, and the pixel electrode. A data voltage applied to the data line may be applied to the pixel electrode in response to a signal applied to the gate line.

The upper substrate may be disposed to face the lower substrate with the liquid crystal layer therebetween. The upper substrate may include a color filter and a common electrode. However, the embodiment of the invention is not limited thereto. In one alternative embodiment, for example, at least one of the color filter or the common electrode may be disposed on the lower substrate. In another alternative embodiment, the upper substrate may be omitted, and a liquid crystal layer sealed by the color filter, the common electrode and an insulating layer may be disposed on the lower substrate.

The upper substrate may have a size less than that of the lower substrate on a plane. A portion of the lower substrate may be exposed by the upper substrate. The liquid crystal layer may include a plurality of liquid crystal molecules. The arranged state of the plurality of liquid crystal molecules may be changed in response to electric fields generated between the lower substrate and the upper substrate.

The display apparatus DD may further include a flexible printed circuit board (not shown) and a printed circuit board (not shown). The printed circuit board may output a signal to the display panel 110 or receive a signal from the display panel 110 through the flexible printed circuit board.

In an embodiment of the invention, an integrated circuit chip may be mounted on the flexible printed circuit board. The integrated circuit chip may include a data driving circuit. The flexible printed circuit board may be a tape carrier package ("TCP") or a chip on film ("COF"). However, the embodiment of the invention is not limited thereto. In one alternative embodiment, for example, the integrated circuit chip may be mounted directly on a surface of the lower substrate.

The optical sheet 120 may be disposed under the display panel 110. The optical sheet 120 may be disposed between the light source 600 and the display panel 110. The display panel 110 may be laminated on the optical sheet 120. In an embodiment, an adhesive layer (not shown) may be disposed between the display panel 110 and the optical sheet 120. The adhesive layer may be a pressure sensitive adhesive ("PSA"), an optical clear adhesive ("OCA"), or an optical clear resin ("OCR"). The optical sheet 120 may be stacked on the transparent mold 300. The optical sheet 120 may function to transmit the light provided from the light source 600 or convert the light from the light source 600 into light having a different wavelength to transmit the converted light, i.e., the light having the different wavelength, to the display panel 110. The optical sheet 120 may include a diffusion sheet 121, a light collecting sheet 122, and a protective sheet 123. The diffusion sheet 121 may serve to diffuse incident light. The light collecting sheet 122 serves to increase in luminance of the diffused light. The protective sheet 123 serves to protect the light collecting sheet 122 and to secure a viewing angle. In an embodiment, as shown in FIG. 2A, the optical sheet 120 may be constituted by six sheets, but is not limited thereto. Alternatively, the optical sheet 120 may be constituted by more than six sheets or less than six sheets. In one embodiment, for example, the optical sheet 120 may be constituted by the light collecting sheet 122 and the protective sheet 123 without the diffusion sheet 121.

The reflective mold 200 may be disposed under the transparent mold 300 to support the transparent mold 300. The reflective mold 200 may have a light reflectance greater than that of the transparent mold 300. The reflective mold 200 may prevent light from leaking out of the display panel 110.

The transparent mold 300 may be disposed between the display module 100 and the reflective mold 200. The transparent mold 300 may overlap the non-display area NDA and the edge display area EDA, which is a portion of the display area DA that is adjacent to the non-display area NDA. The display area DA may be divided into the edge display area EDA adjacent to the non-display area NDA and a center display area CDA extending from the edge display area EDA in a second direction DR2. The transparent mold 300 may support the bottom surface of the display module 100. The transparent mold 300 may include a transparent material to transmit light that progresses from the light source 600 toward the non-display area NDA and the edge display area EDA. In an embodiment, the transparent mold 300 may support a bottom surface of the optical sheet 120.

The transparent mold 300 may be transparent to transmit the light emitted from the light source 600. In an embodiment, the transparent mold 300 may be translucent to diffuse the transmitted light. In such an embodiment, the transparent mold 300 may include a translucent mold that includes a diffusion material disposed or dispersed in a transparent material to transmit and simultaneously diffuse incident light.

The transparent mold 300 may include a first support part 310 that supports the display module 100, a second support part 320 extending from a side end (or an inner side surface) of the first support part 310 in the second direction DR2 in parallel with the display module 100, an inclined part 330 extending to be inclined downward from a lower end of the first support part 310, and a coupling part 340.

The first support part 310 overlaps the non-display area NDA and the edge display area EDA in a third direction DR3. The first support part 310 may support a bottom surface of the optical sheet 120. In one embodiment, for example, the optical sheet 120 may be laminated on the first support part 310. The first support part 310 may overlap the diffusion plate 500 in the second direction DR2. In an embodiment, the first support part 310 is spaced apart from the diffusion plate 500. In an embodiment, a portion of the first support part 310, which overlaps the display module 100 (or supports the display module 100) may have a width (e.g., a length in the second direction DR2) of about 2.5 mm. In one embodiment, for example, a portion of the first support part 310, which overlaps the non-display area NDA, may have a width (e.g., a length in the second direction DR2) of about 0.5 mm in cross section. In such an embodiment, the cross-sectional width (e.g., a length in the second direction DR2) of the non-display area NDA may be about 0.5 mm. In one embodiment, for example, a part of the first support part, which overlaps the edge display area EDA, may have a width (e.g., a length in the second direction DR2) of about 2 mm.

The second support part 320 may overlap a portion of the center display area CD, which is adjacent to the edge display area EDA. In an embodiment, the second support part 320 may have a thickness of about 1.5 mm in the third direction DR3 and may extend by about 7 mm from a side end of the first support part 310 in the second direction DR2.

The inclined part 330 may extend downward from a lower end of the first support part 310 to be inclined from the edge display area EDA in the direction of the center display area CDA. In an embodiment, the inclined part 330 may extend downward to be inclined at an angle of about 45 degrees from the third direction DR3 to the second direction DR2. The inclined part 330 may be disposed on an upper inclined surface of the reflective mold 200. The display apparatus DD may include an adhesive member AM between the inclined part 330 and the inclined surface of the reflective mold 200. The adhesive member AM may allow the inclined part 330 to adhere to the inclined surface of the reflective mold 200 so that the transparent mold 300 is coupled to the reflective mold 200. The adhesive member AM may include a PSA or an OCA, for example, but not being limited thereto.

The coupling part 340 may extend downward from an end of the inclined part 330. The coupling part 340 may be coupled to the reflective mold 200 to fix the transparent mold 300. The coupling part 340 may be coupled to a fixing groove of the reflective mold 200. The transparent mold 300 may be manufactured by injection molding so that each of the first support part 310, the second support part 320 and the inclined part 330 is spaced apart from the reflective mold 200, and the coupling part 340 is coupled to the reflective mold 200. In an alternative embodiment, the transparent mold 300 may further include a portion (not shown) that extends by a length of about 0.8 mm between the second support part 320 and the inclined part 330 in a direction perpendicular to the second support part 320 (or a direction opposite to the third direction DR3), to ensure stability in the injection molding.

The diffusion plate 500 may be disposed below the display module 100. In an embodiment, a single diffusion plate 500 may be provided as illustrated in the drawings, but the embodiment of the invention is not limited thereto. In one alternative embodiment, for example, a plurality of diffusion plates 500 may be provided. The diffusion plate 500 may be disposed on the second support part 320. In an embodiment, the diffusion plate 500 is seated on an end portion of the second support part 320, and an end portion of the diffusion plate 500 is disposed on the second support part 320. In such an embodiment, a cross-sectional width WT (or a length in the second direction DR3) of a contact surface between the end portion of the second support part 320 and the end portion of the diffusion plate 500 may be about 2 mm or greater. In an embodiment, the diffusion plate 500 may be spaced apart from the first support part 310. A spaced distance GP between the diffusion plate 500 and the first support part 310 may be in a range of about 1.5 mm to about 2.5 mm, for example, about 2 mm. The spaced distance GP between the diffusion plate 500 and the first support part 310 may secure an expansion space when the diffusion plate 500 is expanded by heat to prevent defects of the display apparatus DD due to the expansion of the diffusion plate.

In an embodiment, a vertical distance between the diffusion plate 500 and the reflective mold 200 may increase gradually as being away from the non-display area NDA to the center display area CDA of the display area DA.

The display apparatus DD may include a reflective tape RS. The reflective tape RS may overlap an outer side surface of the first support part 310 in the second direction DR2. The outer side surface of the first support part 310 corresponds to an opposite surface of an inner side surface of the first support part 310, which faces the diffusion plate 500. In an embodiment, the reflective tape RS may have a thickness of about 0.5 mm or less. The reflective tape RS may serve to prevent light from leaking to a side surface of the transparent mold 300.

The top cover 800 covers the edge of the display module 100. The top cover 800 is disposed on side surfaces of the display module 100 and the transparent mold 300 to fix the transparent mold 300, the display panel 110 and the optical sheet 120, which are laminated on the transparent mold 300, to each other.

In an alternative embodiment, as shown in FIG. 2B, the display apparatus DD may include a light blocking member 900 instead of the top cover 800 (see FIG. 2A). In one embodiment, for example, the light blocking member 900 may be a black adhesive tape. The light blocking member 900 may cover edges of the display module 100 and the transparent mold 300. The light blocking member 900 may be disposed on the side surface of the display apparatus DD to prevent light from leaking therethrough. In an embodiment, where the light blocking member 900 is disposed instead of the top cover 800, a transparent adhesive TR may be disposed between the transparent mold 300 and the optical sheet 120. The transparent adhesive TR may fix the display panel 110, the optical sheet 120 and the transparent mold 300 to each other. The transparent adhesive TR may include various transparent adhesive materials including an optically transparent resin ("OCR"). In such embodiment, the light blocking member 900 may have a thickness less than that of the top cover 800.

Figure 3:
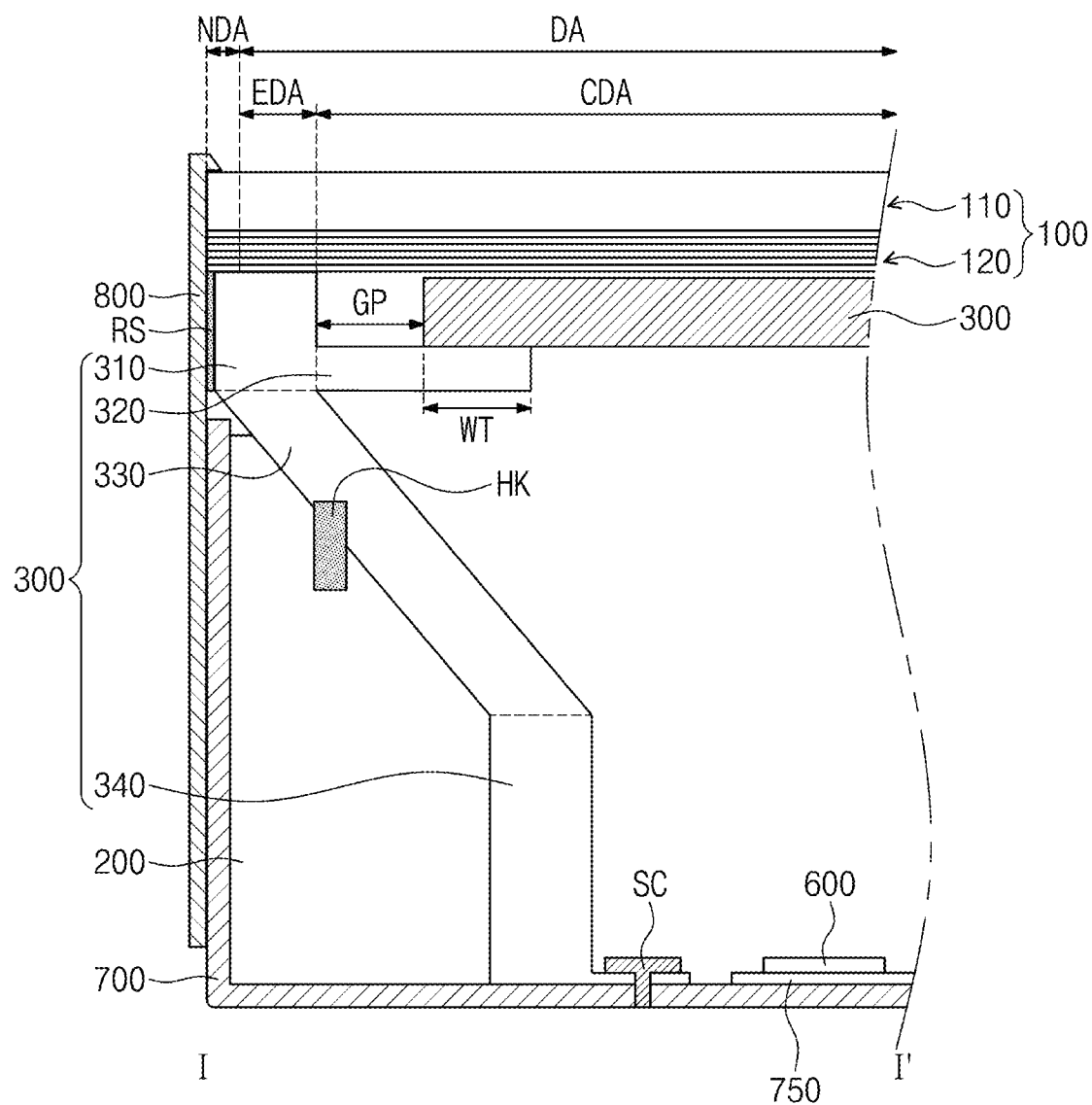
FIG. 3 is a cross-sectional view of a display apparatus according to an alternative embodiment of the invention.

FIG. 3 is a cross-sectional view of the display apparatus according to an alternative embodiment of the invention.

FIG. 3 is a cross-sectional view corresponding to a cross-sectional view taken along line I-I' of FIG. 1.

In an embodiment, as shown in FIG. 3, the transparent mold 300 may be coupled to the reflective mold 200 through a hook HK. The hook HK may be disposed between the transparent mold 300 and the reflective mold 200. In one embodiment, for example, the inclined part 330 of the transparent mold 300 may include the hook HK at a portion that contacts the inclined surface of the reflective mold 200, and the inclined part 330 and the reflective mold 200 may be hooked to be coupled to each other. In one embodiment, for example, the reflective mold 200 may include the hook HK on an inclined surface that contacts the inclined part 330 of the transparent mold 300 and may be hooked to be coupled to the transparent mold 300. In an embodiment, the hook HK disposed between the inclined part 330 of the transparent mold 300 and the reflective mold 200 may couple the transparent mold 300 and the reflective mold 200.

The transparent mold 300 may include the inclined part 330 coupled to the reflective mold 200 and the coupling part 340 coupled to the bottom cover 700. The transparent mold 300 may be fixed through the coupling part 340 to support the display module 100 and the diffusion plate 500. In an embodiment, the coupling part 340 may be coupled to the bottom cover 700. In one embodiment, for example, one end of the coupling part 340 may extend onto the bottom cover 700 and be coupled to the bottom cover 700 by a screw SC. The transparent mold 300 may be coupled to the reflective mold 200 through the hook HK and simultaneously be coupled to the bottom cover 700 by the screw SC to be fixed.

In such an embodiment, the display apparatus DD may include the top cover 800. Alternatively, the display apparatus DD may include the light blocking member 900 instead of the top cover 800. In an embodiment where the light blocking member 900 is provided instead of the top cover 800, the display module 100, the transparent mold 300, and the like may be coupled and fixed through a transparent adhesive (not shown).

Figure 4:
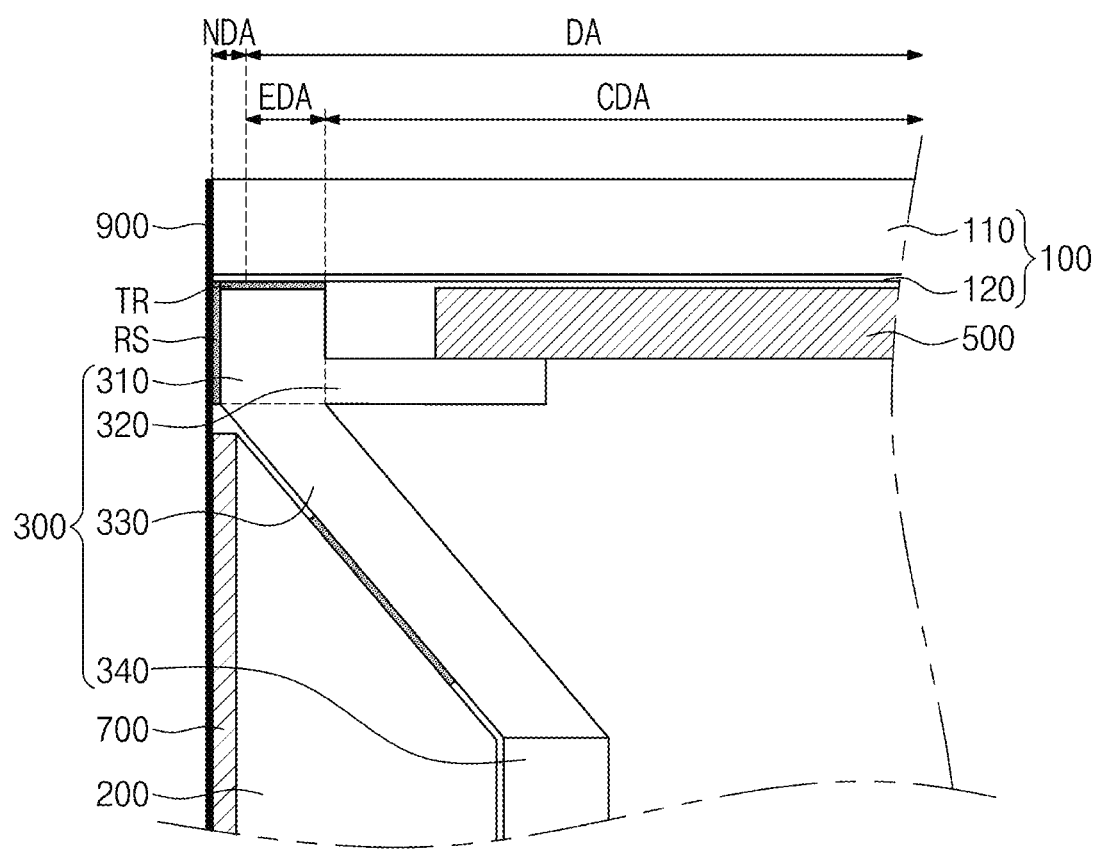
FIG. 4 is a cross-sectional view of a display apparatus according to another alternative embodiment of the invention.

FIG. 4 is a cross-sectional view of the display apparatus according to another alternative embodiment of the invention.

In an embodiment, a display module 100 may include a display panel 110 and an optical sheet 120 coupled to the display panel 110. In such an embodiment, the display module 100 may be coupled to a transparent mold 300 through a transparent adhesive (not shown). In such an embodiment where the display module 100 and the transparent mold 300 are fixed through the transparent adhesive, the display apparatus DD may include a light blocking member 900 on a side surface, instead of a top cover (not shown). The light blocking member 900 may cover edges of the display module 100 and the transparent mold 300 to prevent light from leaking therethrough. The light blocking member 900 may be a black tape for preventing light leakage. Alternatively, the light blocking member 900 may be replaced with the top cover 800 (see FIG. 2A).

In an embodiment, as shown in FIG. 4, the display panel 110 may be integrated with the optical sheet 120 and disposed on the transparent mold 300. In the transparent mold 300, the display module 100, in which the display panel 110 and the optical sheet 120 are integrated with each other, may be disposed on the first support part 310. In an embodiment, the transparent mold 300 may include a transparent adhesive TR between a first support part 310 and the display module 100. The transparent adhesive TR may fix the optical sheet 120 coupled to the display panel 110 on the first support part 310. In such an embodiment, the transparent adhesive TR may include at least one selected from various adhesives including OCR. The diffusion plate 500 may be disposed on the second support part 320.

Figure 5:
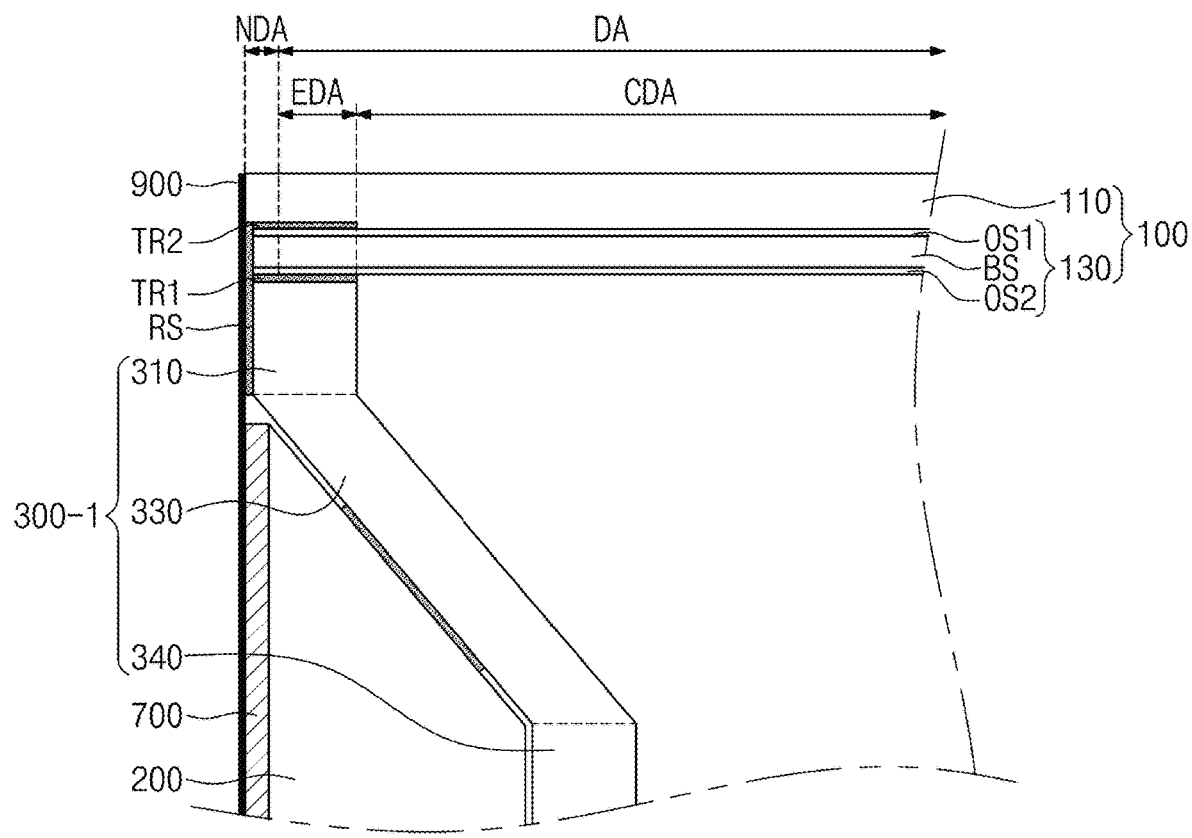
FIG. 5 is a cross-sectional view of the display apparatus according to another alternative embodiment of the invention.

FIG. 5 is a cross-sectional view of the display apparatus according to another alternative embodiment of the invention.

In an embodiment, as shown in FIG. 5, the display module 100 includes the display panel 110 and the optical member 130, and the optical member 130 includes a first light diffusion layer OS1, a second light diffusion layer OS2, and a base substrate BS. In such an embodiment, the optical member 130 may correspond to the optical sheet 120 (see FIG. 2B) and the diffusion plate 500 described above. Therefore, in such an embodiment, the display apparatus DD does not include the optical sheet 120 and the diffusion plate 500. In one embodiment, for example, the first and second light diffusing layers OS1 and OS2 may include a fibrous layer including a nonwoven fabric and a filter layer or a dual brightness enhancement film ("DBEF") including a plurality of reflective layers which have refractive indexes different from each other. The base substrate BS may be disposed between the first light diffusion layer OS1 and the second light diffusion layer OS2. The base substrate BS may have a thermal expansion coefficient less than that of each of the first light diffusion layer OS1 and the second light diffusion layer OS2. In one embodiment, for example, the base substrate BS may be a glass substrate. The optical member 130 may have a high heat dissipation effect through the base substrate BS disposed between the first and second light diffusion layers OS1 and OS2.

In such an embodiment, the reflective tape RS may be disposed on a side surface of the optical member 130 as well as a side surface of the transparent mold 300-1.

In an embodiment, the optical member 130 may be coupled to the transparent mold 300-1 and the display panel 110 through a transparent adhesive. In one embodiment, for example, the optical member 130 may be coupled to the display panel 110 at an upper side thereof through a second transparent adhesive TR2 and may be coupled to the first support part 310 at a lower side thereof through the first transparent adhesive TR1. The transparent mold 300-1 may support the optical member 130. In one embodiment, for example, the transparent mold 300-1 may be coupled to the optical member 130 through the first transparent adhesive TR1 between the first support part 310 and a bottom surface of the second light diffusion layer OS2 to support the display module 100.

In such an embodiment, a light blocking member 900 may be disposed at an edge of the display module 100. The light blocking member 900 may prevent light from leaking to the side surfaces of the display panel 110, the optical member 130, and the transparent mold 300-1.

Figure 6:
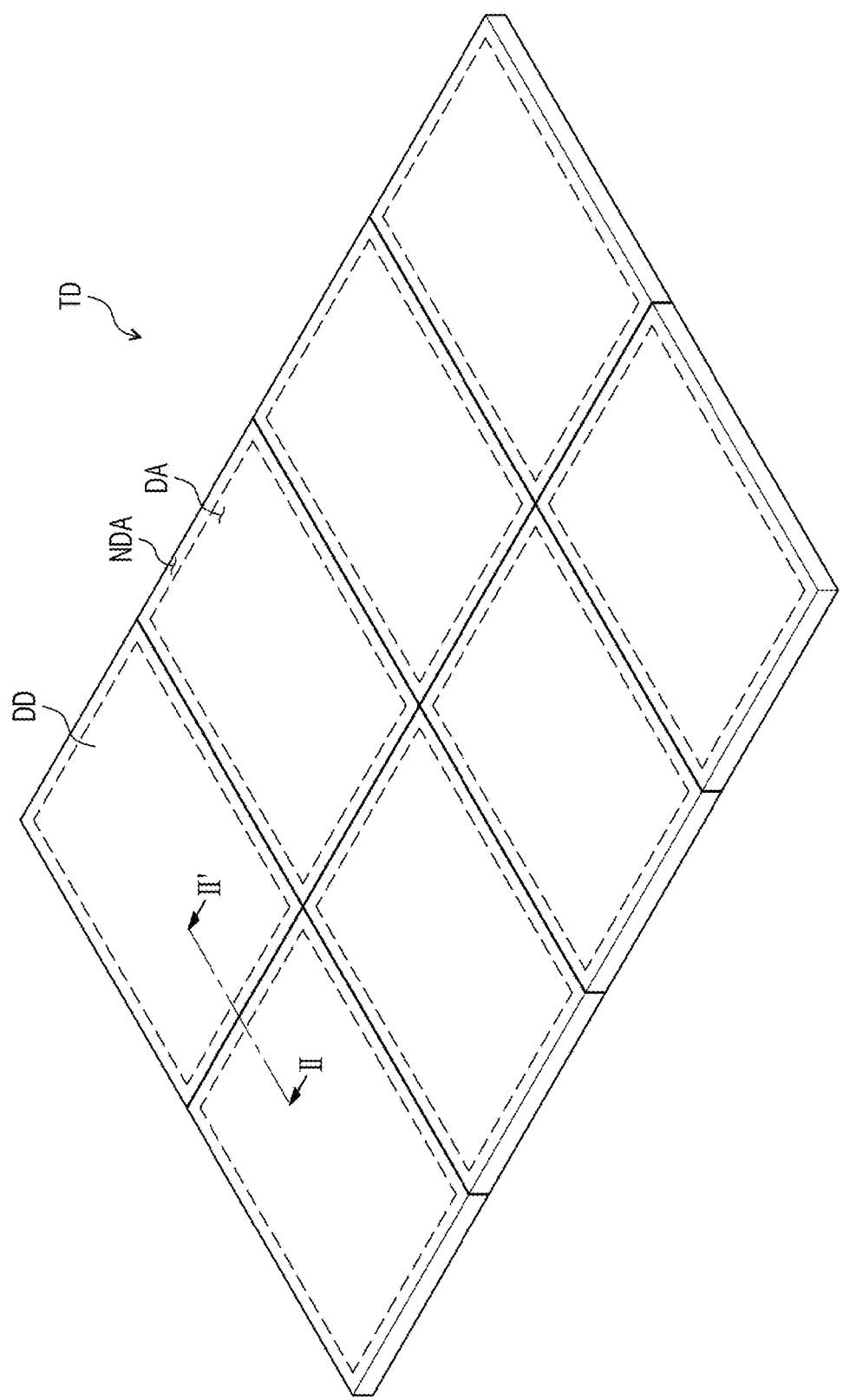
FIG. 6 is a plan view of a tiled display apparatus according to an embodiment of the invention.
Figure 7:
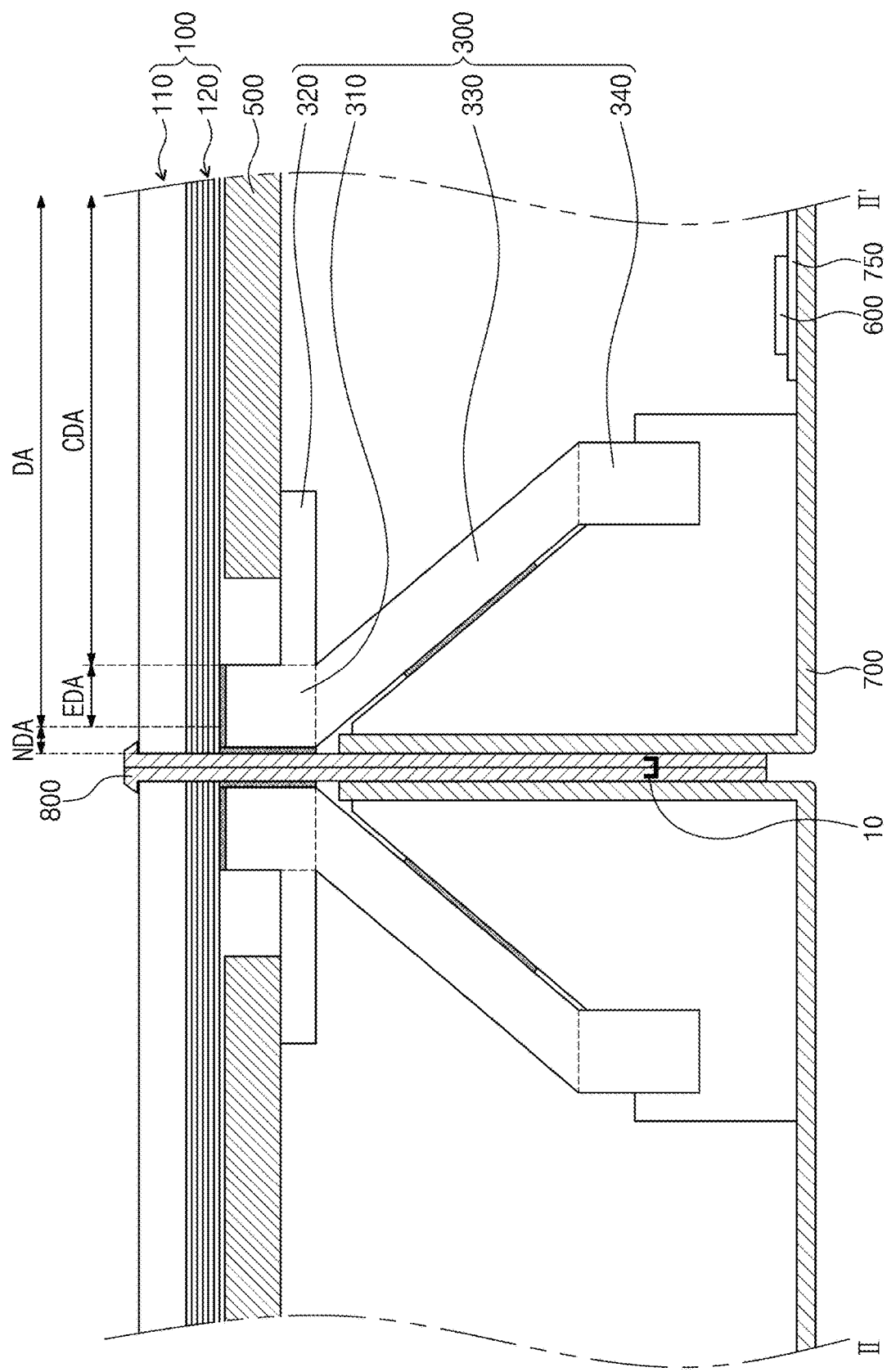
FIG. 7 is a cross-sectional view of the tiled display apparatus according to an embodiment of the invention.

FIG. 6 is a plan view of a tiled display apparatus according to an embodiment of the invention. FIG. 7 is a cross-sectional view of the tiled display apparatus according to an embodiment of the invention. FIG. 7 is a cross-sectional view taken along line II-II' of FIG. 6.

Referring to FIGS. 6 and 7, an embodiment of a tiled display apparatus TD may include a plurality of display apparatuses DD. The plurality of display apparatuses DD may be arranged in a matrix form. The matrix form may include M rows and N columns, where each of M and N is a natural number.

In such an embodiment, each of the plurality of display apparatuses may correspond to an embodiment of the display apparatus DD described above. In such an embodiment, each of the plurality of display apparatuses may include a display module 100 including a display area DA, on which an image is displayed, and a non-display area NDA adjacent to the display area, a transparent mold 300 overlapping the non-display area NDA and an edge display area EDA that is a portion of the display area DA, which is adjacent to the non-display area NDA, to support a bottom surface of the display module 100, and a reflective mold 200 disposed below the transparent mold 300 to support the transparent mold 300 and having a light reflectance greater than that of the transparent mold 300. The transparent mold 300 may include a first support part 310 and a second support part 320. The first support part 310 may overlap the edge display area EDA, and the second support part 320 may overlap a portion of the center display area CDA, which is adjacent to the edge display area EDA.

In an embodiment, each of the plurality of display apparatuses may include a diffusion plate 500. An end of the diffusion plate 500 may be seated on the second support part 320 of the transparent mold 300, and the display module 100 may be seated on the first support part 310 of the transparent mold 300. The first support part 310 and the diffusion plate 500 may be spaced apart from each other.

The plurality of display apparatuses may be disposed or arranged in a way such that the non-display areas NDA are adjacent to each other. In an embodiment, as shown in FIG. 7, the display apparatuses may be coupled to each other by connecting top covers 800 thereof to each other. In one embodiment, for example, the tiled display apparatus TD may include a cover connection member 10 coupling the plurality of display apparatuses DD to each other. The cover connection member 10 may connect the top covers of the plurality of display apparatuses DD to each other. In an embodiment, each of the display apparatuses DD of the tiled display apparatus TD may include a light blocking member 900 (see FIG. 2B) at an edge thereof. The light blocking member may be disposed between the plurality of display apparatuses DD to prevent light leakage.

Each of the plurality of display apparatuses DD may include a transparent mold 300 including a first support part 310 and a second support part 320 to reduce a thickness of a recognized bezel, thereby reducing a thickness of the tiled display apparatus TD.

In an embodiment of the tiled display apparatus TD, as shown in FIG. 7, each display apparatus DD corresponds to one embodiment of the display apparatuses DD, but is not limited thereto. In one embodiment, for example, the tiled display apparatus TD may include at least one of the embodiments of the display apparatus DD described above with reference to FIG. 2A to 5.

Figure 8A:
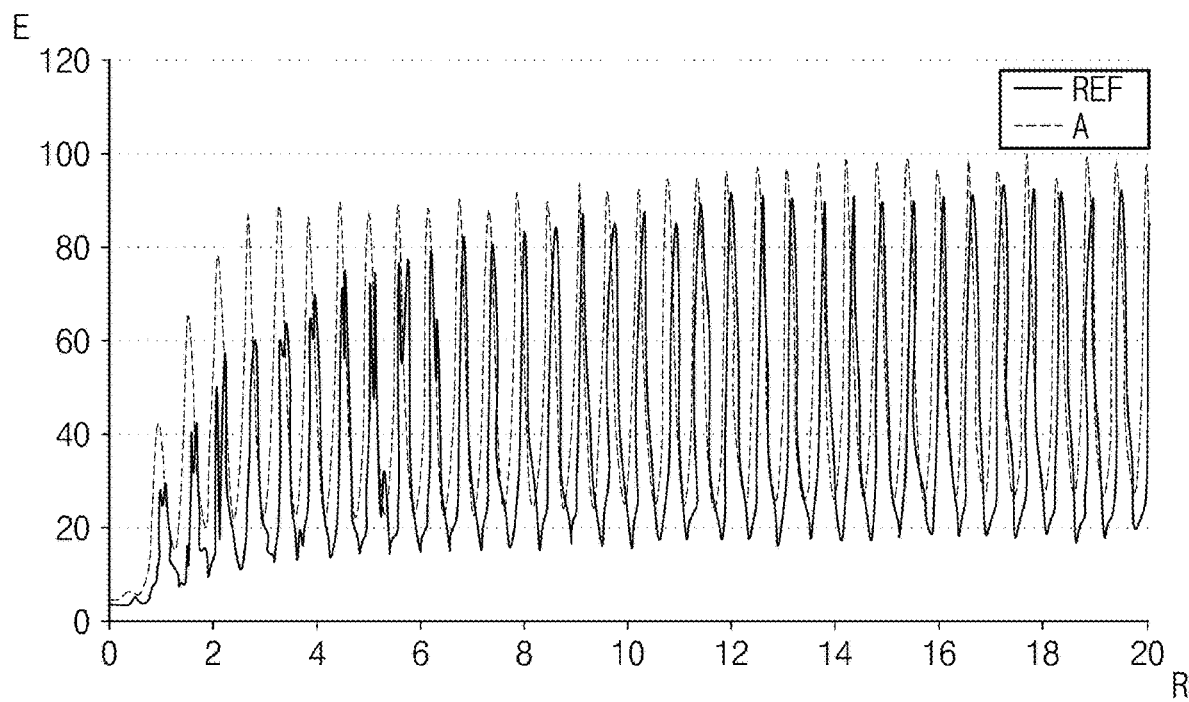
FIG. 8A is a graph illustrating an effect according to an embodiment of the invention.

FIG. 8A is a graph illustrating an effect according to an embodiment of the invention.

In FIG. 8A, a y-axis may represent luminance E of the display apparatus DD, and an x-axis may represent a distance R from an end of the non-display area NDA, which is not adjacent to the display area DA, in a center direction of the display area DA.

A solid line REF represents a change in luminance E depending on the distance R in the case of the display apparatus that does not include the transparent mold 300, and a dotted line A represents a change in luminance E depending on the distance R in the case of the display apparatus including the transparent mold 300 that does not include the first support part 310 (see FIG. 2).

Referring to the dotted line A, the transparent mold 300 including the second support part 320 (see FIG. 2) supporting the diffusion plate 500 may be provided so that the light emitted from the light source is allowed to pass through the second support part of the transparent mold 300 to reach the display panel. Thus, the dotted line A has luminance greater than that of the solid line REF at a distance R in a range of about 2 mm to about 6 mm. However, it may be seen that there is no significant difference when compared to the solid line REF at a distance R in a range of about 0 mm to about 2 mm.

Figure 8B:
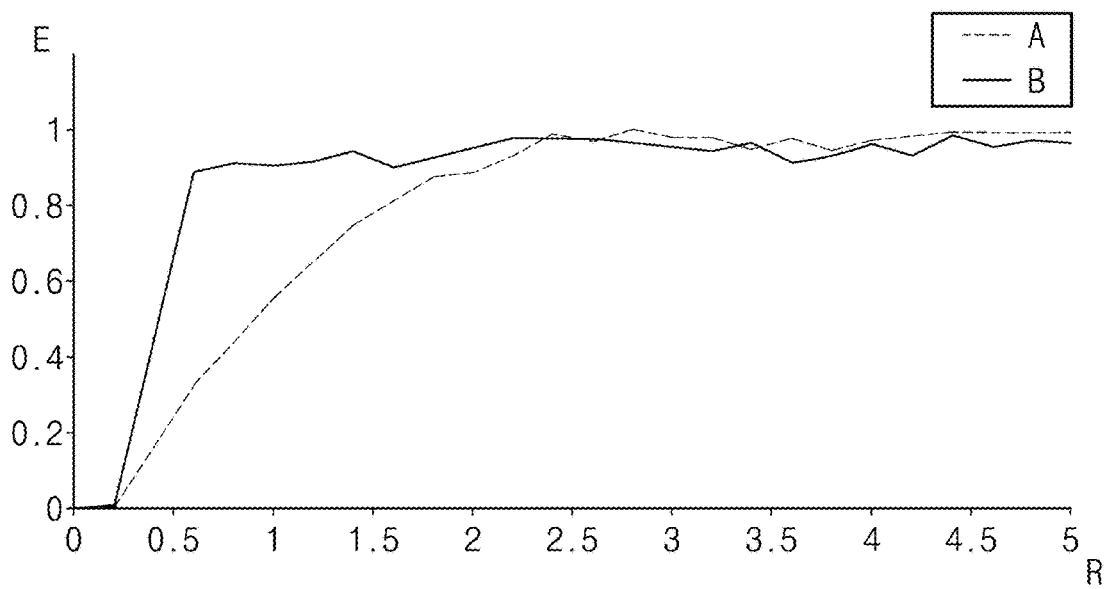
FIG. 8B is a graph illustrating an effect according to an embodiment of the invention.

FIG. 8B is a graph illustrating an effect according to an embodiment of the invention.

In FIG. 8B, a y-axis may represent relative luminance E, and an x-axis may represent a distance R from an end of the non-display area NDA, which is not adjacent to the display area DA, in a center direction of the display area DA.

A dotted line A may illustrate values in a case of the display apparatus of FIG. 8A, and a solid line B may illustrate values in a case of the display apparatus DD according to an embodiment of the invention. In the solid line B, it may be seen that the first support part 310 is provided so that the relative luminance is greater than that in the dotted line A at a distance R in a range of about 0.5 mm to about 2 mm corresponding to the edge display area EDA in the non-display area NDA. The distance R in a range of about 0.5 mm to about 2 mm may correspond to a recognized bezel that is recognized as the bezel by the user. An embodiment of the display apparatus DD may support the non-display area NDA and the edge display area EDA of the display module 100 through the transparent mold 300 including a transparent material. Therefore, the light emitted from the light source 600 may also reach a distance R in a range of about 0 mm to about 2 mm, which is the outer side of the display panel 110. Therefore, the thickness of the recognized bezel may be reduced when compared to the display apparatus in which the outer portion corresponding to the non-display area and the edge display area of the display module 100 is supported through a conventional reflective mold.

In embodiments of the display apparatus and the tiled display apparatus including the display apparatus according to the invention, the transparent mold that supports the non-display area (i.e., bezel) and the lower portion of the display area adjacent to the non-display area may be provided to prevent the dark portion from occurring on the portion of the display area such that the thickness of the recognized bezel that is recognized by the user is reduced.

The invention should not be construed as being limited to the exemplary embodiments set forth herein. Rather, these exemplary embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display apparatus comprising:
   a display module comprising a display area, on which an image is displayed, and a non-display area adjacent to the display area;
   a transparent mold which supports a bottom surface of the display module and overlaps the non-display area and a portion of the display area, which is adjacent to the non-display area, in a top plan view in a thickness direction of the display module; and
   a reflective mold disposed below the transparent mold to support the transparent mold and having a light reflectance greater than a light reflectance of the transparent mold,
   wherein a portion of the transparent mold that overlaps the non-display area and the portion of the display area is disposed entirely above an entirety of the reflective mold and overlaps an inclined portion defining the reflective mold that overlaps the portion of the display area in the top plan view, wherein
   the reflective mold comprises an inclined surface on an upper portion thereof,
   the transparent mold comprises a support part which supports the display module and an inclined part inclined downward from an end of the support part,
   wherein the inclined part is disposed on the inclined surface of the reflective mold.

2. The display apparatus of claim 1, wherein
the display module comprises a display panel and an optical sheet disposed below the display panel, and
the transparent mold supports a bottom surface of the optical sheet.

3. The display apparatus of claim 1, further comprising:
a diffusion plate disposed below the display module,
wherein the transparent mold comprises:
a first support part which supports the bottom surface of the display module; and
a second support part extending from an end of the first support part in parallel to the display module,
wherein an end portion of the diffusion plate is disposed on the second support part.

4. The display apparatus of claim 3, wherein the diffusion plate and the first support part are spaced apart from each other.

5. The display apparatus of claim 3, wherein
the display area is divided into an edge display area adjacent to the non-display area and a center display area which is not adjacent to the non-display area, and
the second support part overlaps a portion of the center display area, which is adjacent to the edge display area.

6. The display apparatus of claim 1, wherein the transparent mold further comprises a coupling part extending downward from an end of the inclined part.

7. The display apparatus of claim 6, further comprising:
an adhesive member between the inclined part and the inclined surface of the reflective mold,
wherein the reflective mold further comprises a fixing groove, and
the coupling part is coupled to the fixing groove.

8. The display apparatus of claim 6, further comprising:
a bottom cover coupled to the coupling part.

9. The display apparatus of claim 3, wherein
the first support part comprises an inner surface facing the diffusion plate and an outer surface opposite to the inner surface, and
the display apparatus further comprises a reflective tape overlapping the outer surface of the first support part.

10. The display apparatus of claim 1, wherein
the display module comprises a display panel and an optical member disposed below the display panel, and
the optical member comprises:
first and second light diffusion layers; and
a base substrate disposed between the first and second light diffusion layers and having a thermal expansion coefficient less than a thermal expansion coefficient of each of the first and second light diffusion layers.

11. The display apparatus of claim 10, wherein the transparent mold supports a bottom surface of the optical member.

12. The display apparatus of claim 1, wherein the transparent mold comprises a light diffusion material disposed therein.

13. A display apparatus comprising:
a display module comprising: a display panel including a display area for displaying an image and a non-display area adjacent to the display area; a diffusion plate disposed below the display panel; and an optical sheet disposed between the display panel and the diffusion plate;
a reflective mold disposed below the display module; and
a transparent mold disposed between the display module and the reflective mold to support the display module,
wherein the transparent mold comprises:
a first support part which supports a bottom surface of an end portion of the optical sheet and overlaps the non-display area and a portion of the display area, which is adjacent to the non-display area, in a top plan view in a thickness direction of the display module;
a second support part which supports a bottom surface of an end portion of the diffusion plate; and
an inclined part extending to be inclined from an end of the first support part that overlaps the non-display area and a portion of the display area and having a bottom surface contacting a top surface of the reflective mold.

14. The display apparatus of claim 13, wherein the diffusion plate and the first support part are spaced apart from each other.

15. The display apparatus of claim 13, wherein a spaced distance between the diffusion plate and the first support part is in a range of about 1.5 mm to about 2.5 mm.

16. The display apparatus of claim 13, wherein a vertical distance between the diffusion plate and the reflective mold gradually increases as being away from the non-display area toward the inside of the display area.

17. The display apparatus of claim 13, further comprising:
a coupling part extending from an end of the inclined part and coupled to the reflective mold or a bottom cover.

18. The display apparatus of claim 13, wherein a cross-sectional contact width between the second support part and the diffusion plate is about 2 mm or greater.

* * * * *